(12) United States Patent
Deguchi et al.

(10) Patent No.: US 10,910,980 B2
(45) Date of Patent: Feb. 2, 2021

(54) CONTROL DEVICE FOR SWITCHED RELUCTANCE MOTOR

(71) Applicants: TOYOTA JIDOSHA KABUSHIKI KAISHA, Toyota (JP); Tokyo University of Science Foundation, Tokyo (JP)

(72) Inventors: Junichi Deguchi, Susono (JP); Makoto Funahashi, Gotemba (JP); Kensuke Yoshizue, Susono (JP); Nobukazu Hoshi, Tokyo (JP); Tomoya Abe, Tokyo (JP); Yusuke Kobayashi, Tokyo (JP); Yosuke Murakami, Tokyo (JP)

(73) Assignees: TOYOTA JIDOSHA KABUSHIKI KAISHA, Toyota (JP); Tokyo University of Science Foundation, Tokyo (JP)

( * ) Notice: Subject to any disclaimer, the term of this patent is extended or adjusted under 35 U.S.C. 154(b) by 694 days.

(21) Appl. No.: 15/722,198

(22) Filed: Oct. 2, 2017

(65) Prior Publication Data
US 2018/0102722 A1    Apr. 12, 2018

(30) Foreign Application Priority Data

Oct. 12, 2016    (JP) .................................. 2016-201252

(51) Int. Cl.
| | | |
|---|---|---|
| H02P 25/08 | (2016.01) | |
| H02K 37/02 | (2006.01) | |
| H02P 25/092 | (2016.01) | |
| H02P 3/06 | (2006.01) | |
| H02P 25/098 | (2016.01) | |
| H02K 1/24 | (2006.01) | |
| H02K 5/04 | (2006.01) | |
| H02K 19/10 | (2006.01) | |

(52) U.S. Cl.
CPC ........... *H02P 25/098* (2016.02); *H02K 1/246* (2013.01); *H02K 5/04* (2013.01); *H02K 19/103* (2013.01); *H02K 37/02* (2013.01); *H02P 3/065* (2013.01); *H02P 25/08* (2013.01); *H02P 25/092* (2016.02)

(58) Field of Classification Search
CPC ....... H02K 37/02; H02P 25/08; H02P 25/092; H02P 3/065
USPC ...................................................... 310/49.43
See application file for complete search history.

(56) References Cited

U.S. PATENT DOCUMENTS

| | | | |
|---|---|---|---|
| 6,008,601 A * | 12/1999 | Sugiyama | B60L 3/0023 318/400.29 |
| 8,400,084 B2 * | 3/2013 | Umemori | B60L 7/10 318/254.1 |

(Continued)

FOREIGN PATENT DOCUMENTS

| | | |
|---|---|---|
| CN | 104270047 A | 1/2015 |
| JP | 2013-240200 A | 11/2013 |

*Primary Examiner* — Gary A Nash
(74) *Attorney, Agent, or Firm* — Hunton Andrews Kurth LLP

(57) ABSTRACT

In a control device for a switched reluctance motor, a voltage drop control is executed in which a voltage dropped to be lower than a voltage applied in a case where the switched reluctance motor is driven in a high-load region is applied to the switched reluctance motor, in a case where the switched reluctance motor is driven in a low-load region. The low-load region is a lower load region than the high-load region.

7 Claims, 11 Drawing Sheets

(56) References Cited

U.S. PATENT DOCUMENTS

| | | | |
|---|---|---|---|
| 2011/0219816 A1* | 9/2011 | Tanaka | H02P 23/009 62/498 |
| 2011/0234132 A1* | 9/2011 | Norell | A47L 9/2842 318/400.14 |
| 2012/0169267 A1* | 7/2012 | Nashiki | H02P 25/086 318/701 |
| 2013/0147416 A1* | 6/2013 | Khalil | H02P 25/08 318/701 |
| 2013/0342040 A1* | 12/2013 | Umemori | H02P 25/092 310/49.43 |

* cited by examiner

CONTROL DEVICE FOR SWITCHED RELUCTANCE MOTOR

INCORPORATION BY REFERENCE

The disclosure of Japanese Patent Application No. 2016-201252 filed on Oct. 12, 2016, including the specification, drawings and abstract is incorporated herein by reference in its entirety.

BACKGROUND

1. Technical Field

The present disclosure relates to a control device for a switched reluctance motor.

2. Description of Related Art

Japanese Unexamined Patent Application Publication No. 2013-240200 (JP 2013-240200 A) discloses a control device that switches between an excitation start angle and an excitation end angle in respective control modes at the time of low load, at the time of middle load, and at the time of high load in order to improve the operation efficiency and the energy density of a switched reluctance motor.

SUMMARY

However, in the configuration described in JP 2013-240200 A, the efficiency is taken into consideration, but noise and vibration are not taken into consideration. In the configuration described in JP 2013-240200 A, the change gradient of a current caused to flow to the switched reluctance motor becomes steep when priority is given to the efficiency, in a case where the switched reluctance motor is driven in a low-load region. For that reason, the change in a vibratory force may become large at the time of low load, and the noise and the vibration may be increased.

The present disclosure provides a control device for a switched reluctance motor that can reduce vibration and noise in a case where a switched reluctance motor is driven in a low-load region.

An aspect of the present disclosure relates to a control device for a switched reluctance motor. The control device includes an electronic control unit configured to execute a voltage drop control in which a voltage dropped to be lower than a voltage applied in a case where the switched reluctance motor is driven in a high-load region is applied to the switched reluctance motor, in a case where the switched reluctance motor is driven in a low-load region. The low-load region is a lower load region than the high-load region.

According to the aspect, the dropped voltage is applied to the switched reluctance motor when the switched reluctance motor is executed in the low-load region. Therefore, the current varies slowly, and the change width of the current becomes narrow. Accordingly, the change in the vibratory force at the time of low load can be suppressed, and the noise and the vibration can be reduced.

In the control device according to the aspect, the low-load region may be a drive region in which at least one of a case where a rotational speed of the switched reluctance motor is lower than a predetermined rotational speed and a case where a torque of the switched reluctance motor is smaller than a predetermined torque is satisfied.

In the control device according to the aspect, the electronic control unit may be configured to gradually drop a voltage applied to the switched reluctance motor as an operation point of the switched reluctance motor changes from an operation point on a relatively high-load side to an operation point on a relatively low-load side within the low-load region when the voltage drop control is executed.

According to the aspect, since the voltage applied to the switched reluctance motor can be gradually dropped, a drive state of the switched reluctance motor can be gradually changed. Accordingly, the occurrence of the torque fluctuation occurring when the drive state of the switched reluctance motor changes abruptly can be suppressed.

In the control device according to the aspect, the electronic control unit may be configured to execute the voltage drop control and control an excitation width of a current caused to flow to the switched reluctance motor to a predetermined width, in a case where the switched reluctance motor is driven in a region on a relatively high-load side within the low-load region. The electronic control unit may be configured to execute the voltage drop control and execute an excitation width expansion control in which the excitation width of the current caused to flow to the switched reluctance motor is expanded more than the predetermined width, in a case where the switched reluctance motor is driven in a region on a relatively low-load side within the low-load region.

According to the aspect, the vibration and the noise can be reduced by dropping the applied voltage, and the vibration and the noise can be reduced by expanding the excitation width. Accordingly, an effect of reducing the vibration and the noise by expanding the excitation width of the current can be added to the effect of reducing the vibration and the noise by applying the dropped voltage.

In the control device according to the aspect, the electronic control unit may be configured to gradually expand the excitation width of the current as the operation point of the switched reluctance motor changes to the relatively low-load side within the low-load region when the excitation width expansion control is executed.

According to the aspect, since the excitation width of the current applied to the switched reluctance motor can be gradually expanded, a drive state of the switched reluctance motor can be gradually changed. Accordingly, the occurrence of the torque fluctuation occurring in a case where the drive state of the switched reluctance motor changes abruptly can be suppressed.

In the control device according to the aspect, the electronic control unit may be configured to execute control in a current waveform in which a value of a current flowing through the switched reluctance motor continues to decrease in a state where a positive voltage is applied to the switched reluctance motor when the voltage drop control is executed.

According to the aspect, it is possible to realize the current waveform in which the value of the current continues to decrease in a state where the positive voltage is applied to the switched reluctance motor. Therefore, the number of times of switching of an inverter can become less. For that reason, switching loss can be reduced, and efficiency degradation of the switched reluctance motor can be suppressed.

In the control device according to the aspect, the current waveform in which the value of the current continues to decrease may be a current waveform in which the value of the current decreases more slowly than a current waveform in a state where a voltage applied to the switched reluctance motor is set to 0 V or a current waveform in a state where a negative voltage is applied to the switched reluctance motor.

According to the aspect, the value of the current flowing through the switched reluctance motor in a state where the positive voltage is applied to the switched reluctance motor decreases more slowly than that in a case where the voltage is 0 V or in a case where the negative voltage is applied. That is, abrupt decrease of the value of the current can be suppressed. Additionally, since the value of the current continues to decrease slowly while the positive voltage is applied, the number of times of switching of the inverter can be reduced. For that reason, switching loss can be reduced, and efficiency degradation of the switched reluctance motor can be suppressed.

In the present disclosure, the dropped voltage is applied to the switched reluctance motor when the switched reluctance motor is driven in the low-load region. Therefore, the current varies slowly, and the change width of the current becomes narrow. Accordingly, the change in the vibratory force at the time of low load can be suppressed, and the noise and the vibration can be reduced.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Hereinafter, control devices for switched reluctance motors in embodiments of the present disclosure will be specifically described with reference to the drawings.

1. System Configuration

Figure 1:
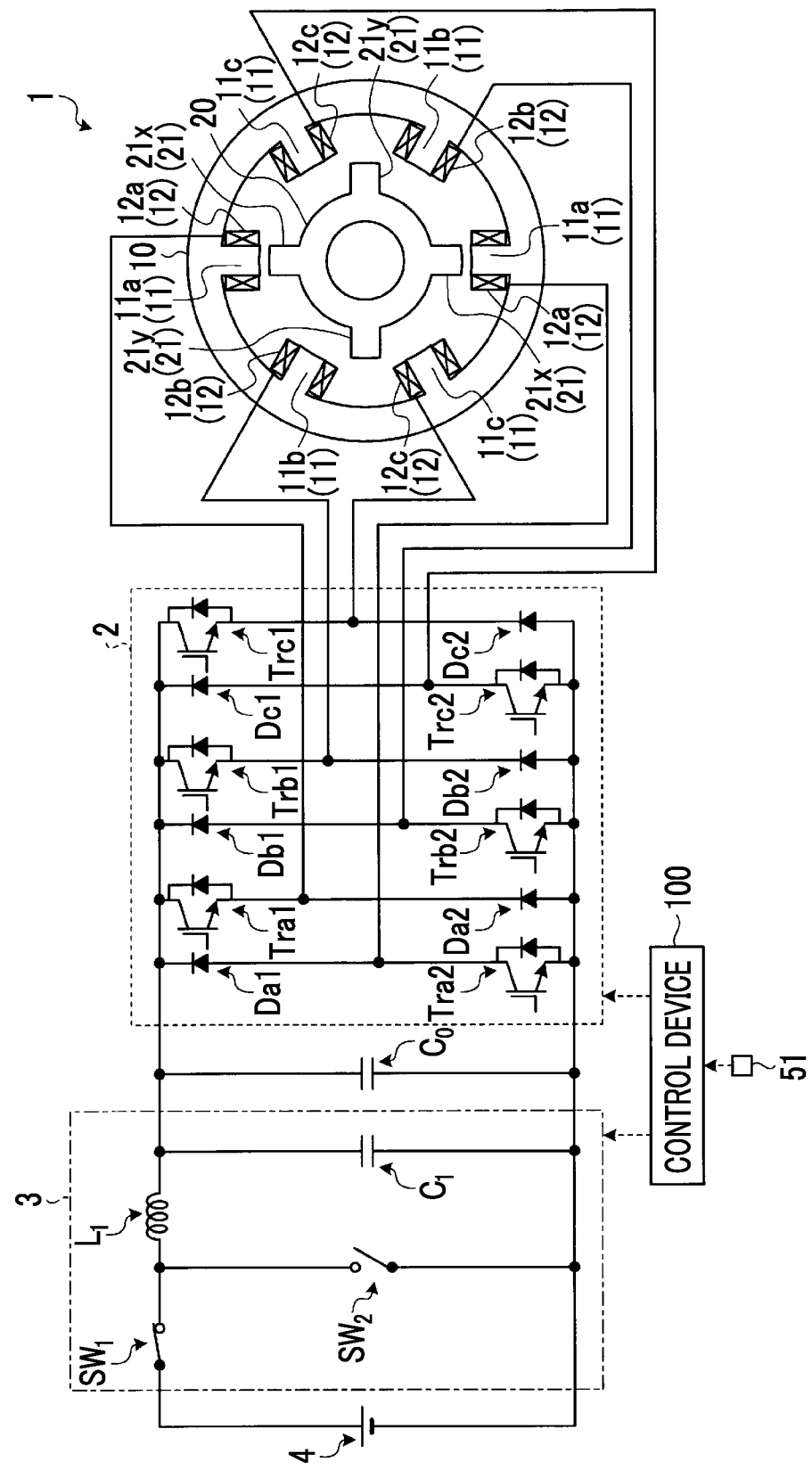
FIG. 1 is a schematic view illustrating an example of a system configuration of an embodiment.

FIG. 1 is a schematic view illustrating an example of a system configuration including a control device for a switched reluctance motor in one embodiment of the present disclosure. The system configuration of the present embodiment includes a switched reluctance motor (hereinafter referred to as "SR motor") 1, an inverter 2, a voltage drop unit 3, a battery 4, and a control device 100.

The SR motor 1 is an electric motor in which a permanent magnet is not used for a rotor, and includes a stator 10 having a salient pole structure, and a rotor 20 having a salient pole structure. The SR motor 1 illustrated in FIG. 1 is a three-phase induction motor that has a hexapolar stator 10 and a quadrupolar rotor 20.

The stator 10 includes a plurality of stator teeth 11 serving as salient poles at an inner peripheral part of an annular structure. A coil 12 connected to the inverter 2 is wound around each stator tooth 11. In the stator 10, a pair of stator teeth 11a disposed at positions that face each other in a radial direction constitutes one phase. The rotor 20 is disposed radially inward of the stator 10. The rotor 20 includes a plurality of rotor teeth 21 serving as salient poles at an outer peripheral part of an annular structure. The rotor 20 rotates integrally with a rotor shaft that is not illustrated.

Since the SR motor 1 is of a three-phase alternating current type, the SR motor includes an A phase formed by the stator teeth 11a and a coil 12a, a B phase formed by a pair of stator teeth 11b and a coil 12b, and a C phase formed by a pair of stator teeth 11c and a coil 12c. The rotor 20 includes a pair of rotor teeth 21x, and a pair of rotor teeth 21y.

The SR motor 1 is electrically connected to the battery 4 via the inverter 2 and the voltage drop unit 3. The SR motor 1 and the inverter 2 are electrically connected to each other by the coils 12. Additionally, the SR motor 1 functions as an electric motor and a generator.

The inverter 2 includes an electrical circuit (inverter circuit) equipped with six switching elements such that a three-phase alternating current can be applied to the coils 12. The inverter 2 causes a current to flow to each coil 12 connected to the inverter circuit for each phase. The inverter circuit illustrated in FIG. 1 has transistors serving as the switching elements, and each phase includes two transistors and two diodes. In each phase, the inverter 2 simultaneously turns the two transistors on or off, thereby changing the value of a current that flows to the coil 12. The A phase includes transistors Tra1, Tra2 and diodes Da1, Da2. The B phase includes the transistors Trb1, Trb2 and the diodes Db1, Db2. The C phase includes transistors Trc1, Trc2 and diodes Dc1, Dc2. As illustrated in FIG. 1, a smoothing capacitor $C_0$ is connected to the inverter 2.

The voltage drop unit 3 is an electrical circuit (a voltage drop circuit) that is provided between the inverter 2 and the battery 4 and drops a voltage (hereinafter referred to as an "applied voltage") to be applied to the SR motor 1. The voltage drop circuit illustrated in FIG. 1 is a circuit that includes a first switch $SW_1$, a second switch $SW_2$, a coil $L_1$, and a capacitor $C_1$ and is capable of dropping a voltage by switching the first switch $SW_1$ and the second switch $SW_2$ ON/OFF. Switching control of the switches $SW_1$, $SW_2$ is executed by the control device 100.

The control device 100 is an electronic control unit (ECU) that controls the SR motor 1. The control device 100 has a CPU and a storage unit in which data, such as various programs, are stored, and a control unit that performs various kinds of calculation for controlling the SR motor 1 is included in the CPU. A command signal for controlling the SR motor 1 is output from the control device 100 to the inverter 2 and the voltage drop unit 3 as a result of the calculation in the control unit. The control device 100 controls the inverter 2 and the voltage drop unit 3, thereby controlling the voltage (applied voltage) to be applied to the SR motor 1 and a current (exciting current) caused to flow to the coil 12.

For example, when the control device 100 controls the voltage drop unit 3, the control device turns on the first switch $SW_1$ and turns off the second switch $SW_2$, to control the voltage drop unit to be in a power supply state of supplying the voltage of the battery 4 to the SR motor 1. Moreover, when the control device 100 controls the voltage drop unit 3, the control device turns off the first switch $SW_1$ and turns on the second switch $SW_2$, and controls the voltage drop unit to be in a non-power supply state where the voltage of the battery 4 is not supplied to the SR motor 1. Then, the voltage to be applied to the SR motor 1 according to the ratio of the time (power supply time) of the power supply state and the time of the non-power supply state (non-power supply time) can be dropped with respect to the voltage of the battery 4. Additionally, the voltage drop unit 3 can be controlled such that the ratio of the non-power supply time becomes large, thereby increasing the voltage drop amount of the applied voltage.

Additionally, a resolver signal is input from a rotational speed sensor 51, which detects the rotational speed of the SR motor 1, to the control device 100. The control device 100 executes the drive control of repeating switching of the coil 12 used as an energization target in each phase, based on a relative positional relationship between the stator teeth 11 and the rotor teeth 21 in a rotational direction, from the resolver signal of the rotational speed sensor 51. By executing the drive control, the control device 100 rotates the rotor 20. In the drive control, the control device 100 causes a current to flow to a coil 12 having a certain phase to magnetize a stator tooth 11, and generates a magnetic attraction force between the stator tooth 11 and a rotor tooth 21 close to the stator tooth 11. The magnetic attraction force can be resolved into component forces in a circumferential direction and a radial direction. The component force in the circumferential direction is a rotative force, and the component force in the radial direction is a radial force. As the rotative force that is a circumferential component of the magnetic attraction force acts on the rotor 20, the torque of the SR motor 1 is generated. The radial force that is a radial component of the magnetic attraction force causes noise or vibration (NV). The sound pressure caused by the SR motor 1 during driving becomes high as the radial force becomes large. When the radial force acting on the SR motor 1 becomes large, displacement of the stator 10 or the rotor 20 becomes large, and the vibration thereof becomes large.

In a case where a stator tooth 11 and a rotor tooth 21 are at positions that overlap each other in the circumferential direction (in a case where the stator tooth 11 and the rotor tooth 21 are at positions that face each other in the radial direction), the magnetic attraction force acts solely in the radial direction. The rotative force does not act on the rotor tooth 21 but solely the radial force acts on the rotor teeth. For that reason, when the stator tooth 11, used as the excitation target by causing a current to flow to the coil 12, is at the position that faces and overlaps the rotor tooth 21 in the radial direction or before and after the stator tooth 11 overlaps the rotor tooth 21, the control device 100 sets the stator tooth 11 to a non-excitation target caused by the stop of energization to the coil 12. Additionally, the control device 100 sets the rotor tooth 21 to an excitation target when the next rotor tooth 21 approaches a predetermined position.

2. Drive Region Map

Figure 2:
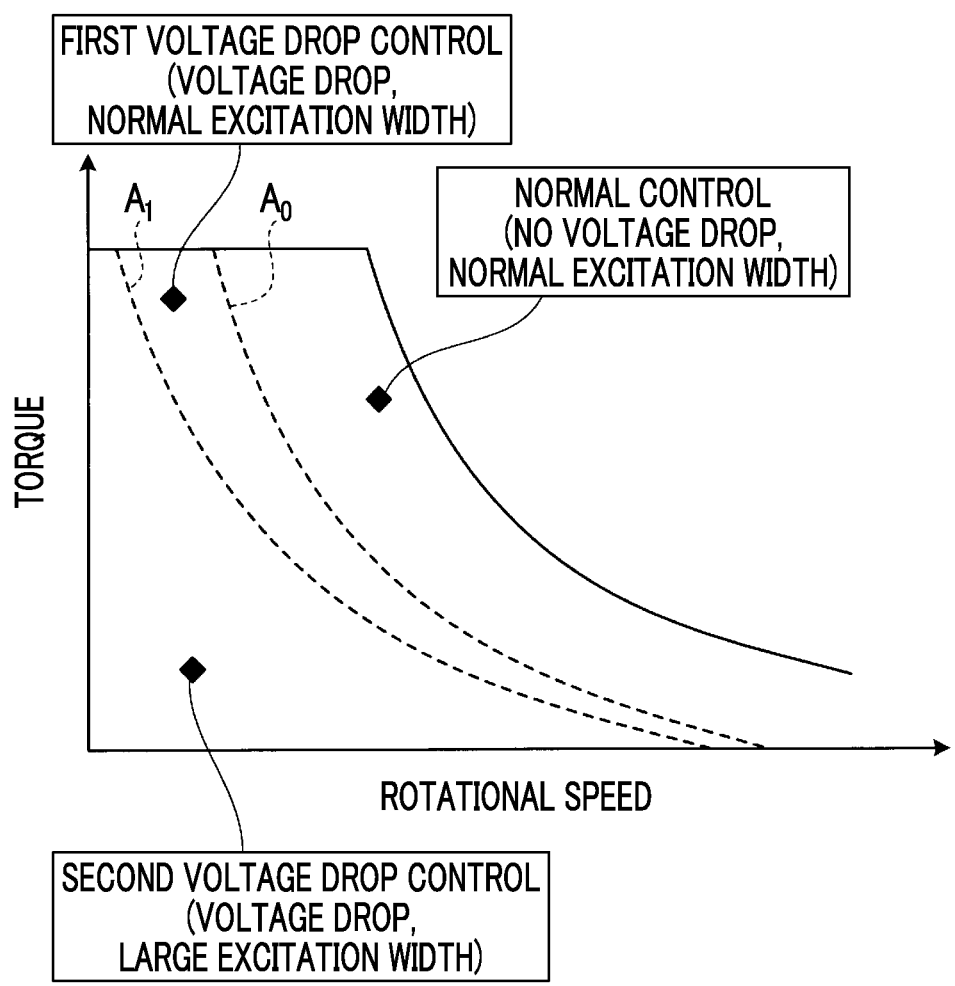
FIG. 2 is an N-T diagram of a switched reluctance motor.

FIG. 2 is an N-T diagram illustrating the properties of the SR motor 1. The N-T diagram of FIG. 2 is a map in which a horizontal axis represents the rotational speed of the SR motor 1 and a vertical axis represents the torque of the SR motor 1.

The SR motor 1 is driven within a drive region of the map illustrated in FIG. 2. According to the map, the maximum torque of the SR motor 1 is a rated torque at a low rotational speed side and decreases at a high rotational speed side as the rotational speed of the SR motor 1 rises.

The control device 100 switches among three control modes of normal control, first voltage drop control, and second voltage drop control to control the SR motor 1, according to a load state during the driving of the SR motor 1. In the respective control modes, the presence/absence of voltage drop of the applied voltage is different from the presence/absence of expansion of the excitation width of a current. The control device 100 includes a control unit that executes the voltage drop control of dropping the applied voltage, and a control unit that executes the excitation width expansion control of expanding the excitation width.

The normal control is a control mode of controlling the SR motor 1 in a state (normal state) where there is no voltage drop of the voltage and no expansion of the excitation width. When the control device 100 executes the normal control mode, the control device applies a normal voltage without performing voltage drop of a battery voltage by the voltage drop unit 3, and controls the excitation width of the current to a normal excitation width.

The first voltage drop control is a control mode of controlling the SR motor 1 in a state (first voltage drop state) where there is voltage drop of the voltage and no expansion of the excitation width. When the control device 100 executes the first voltage drop control mode, the control device executes the voltage drop performed by the voltage drop unit 3, and controls the excitation width of the current to the normal excitation width.

The second voltage drop control is a control mode of controlling the SR motor 1 in a state (second voltage drop state) where there is voltage drop of the voltage and expansion of the excitation width. When the control device 100 executes the second voltage drop control mode, the control device executes the voltage drop performed by the voltage drop unit 3, and controls the excitation width of the current to a width wider than a normal width.

The map illustrated in FIG. 2 is used when switching is made among the three control modes. By using the map illustrated in FIG. 2, the control device 100 determines whether the operation point of the SR motor 1 is included in any point of a high-load drive region (high-load region) and a low-load drive region (low-load region). The operation point of the SR motor 1 is set depending on a motor rotational speed and a motor torque. That is, the control device 100 determines whether the SR motor 1 during driving is in the high-load state or the low-load state by using the rotational speed (motor rotational speed) of the SR motor 1 and the demanded torque (target motor torque) of the SR motor 1 as parameters, at the time of switching among the three control modes.

Specifically, the drive region within the map illustrated in FIG. 2 is divided into the high-load region and the low-load region with a voltage drop switching line $A_0$ as a boundary. The voltage drop switching line $A_0$ is set such that the torque decreases as the motor rotational speed increases. For example, the voltage drop switching line $A_0$ is set to a shape along an equal output line (not illustrated) of the SR motor 1 and is provided on an equal output line, such as a relatively low-output side. That is, the low-load region in the embodiment is a region closer to the low-output side than the voltage drop switching line $A_0$. As illustrated in FIG. 2, the low-load region is a drive region in which at least one of a case where the motor rotational speed is lower than a predetermined rotational speed and a case where the torque of the SR motor 1 is smaller than a predetermined torque is satisfied. Moreover, since the low-load region is a drive region where it is desired to reduce the vibration and the noise, the low-load region is a region where the control mode (the first voltage drop control, the second voltage drop control) of executing voltage drop of the voltage is selected. That is, the voltage drop switching line $A_0$ represents a boundary between a drive region where the applied voltage is dropped and a drive region where the applied voltage is not dropped. On the other hand, since the high-load region in the embodiment is a region closer to a high-output side (a region to be driven in a case where a high output is demanded) than the voltage drop switching line $A_0$, the high-load region is a drive region where voltage drop of the applied voltage is not executed. That is, the high-load region is a region where the control mode (normal control) where voltage drop of the applied voltage is not executed is selected.

Moreover, the low-load region is divided into a region where the current is caused to flow with the normal excitation width and a region controlled to an excitation width expanded more than the normal excitation width, with an excitation width switching line $A_1$ as a boundary. As illustrated in FIG. 2, the excitation width switching line $A_1$ is provided closer to a low-load side (low-output side) than the voltage drop switching line $A_0$, and is set such that the torque decreases as the motor rotational speed increases. For example, the excitation width switching line $A_1$ is set to a shape along an equal output line of the SR motor 1 on the low-output side lower than that of the voltage drop switching line $A_0$.

Additionally, in the control device 100, a voltage value at the normal time and a voltage value at the time of voltage drop are set in advance. Then, the control device 100 executes the control of switching between the voltage at the normal time and the voltage at the time of voltage drop when switching is made between the normal control and the voltage drop control (the first voltage drop control and the second voltage drop control). Additionally, since the voltage drop control is a control mode in which at least the applied voltage is dropped, it does not matter whether or not the excitation width of the current is expanded.

3. Drive Control

Figure 3:
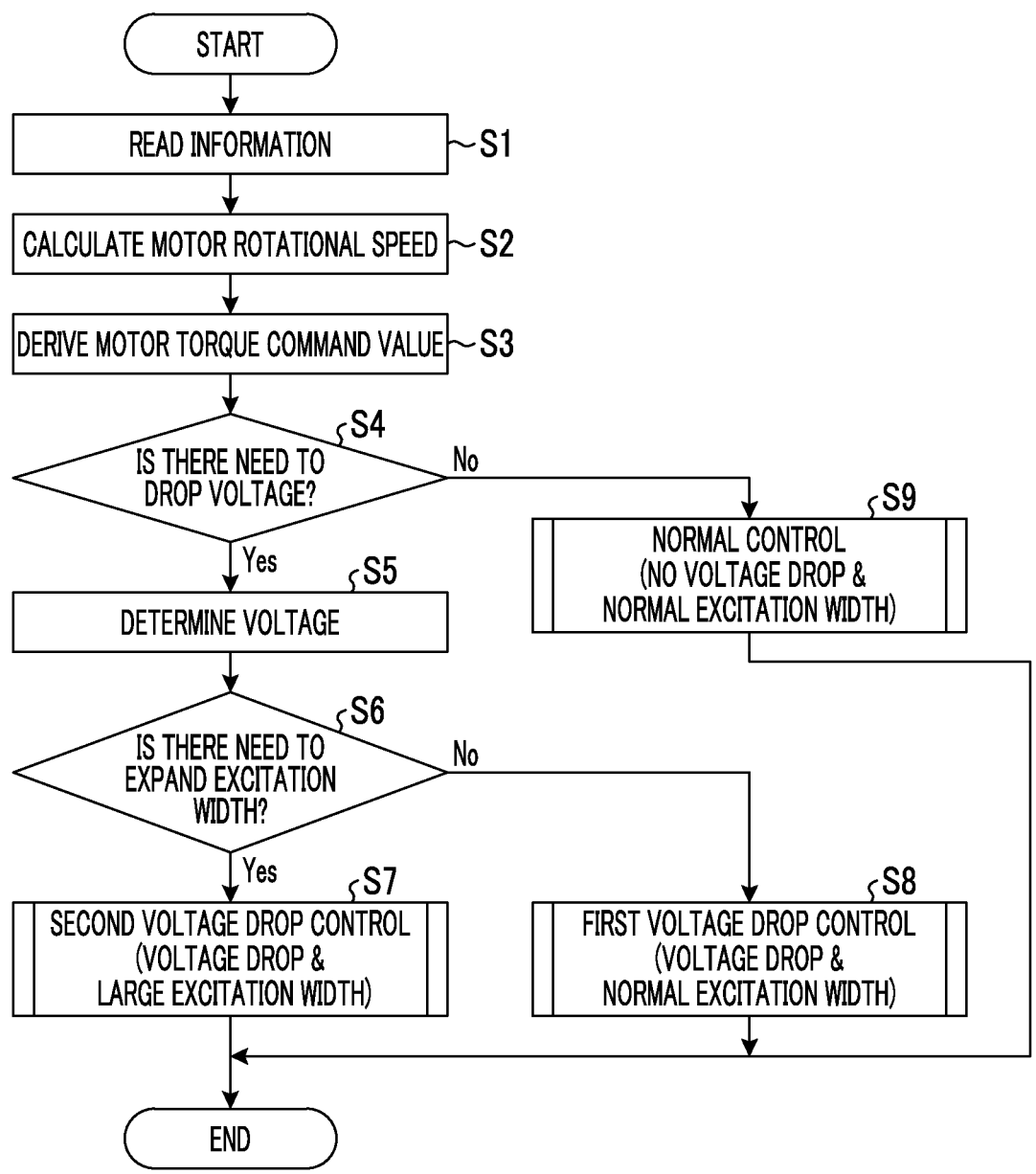
FIG. 3 is a flowchart illustrating an example of a drive control flow.

FIG. 3 is a flowchart illustrating an example of a drive control flow. The drive control flow illustrated in FIG. 3 is executed by the control device 100. Additionally, in the embodiment, the applied voltage at the normal time is set in advance to 600 V and the applied voltage at the time of voltage drop is set in advance to 300 V.

As illustrated in FIG. 3, the control device 100 reads various kinds of information used for the drive control of the SR motor 1 (Step S1). The resolver signal input from the rotational speed sensor 51 and the demanded torque of the SR motor 1 are included in the above information. The resolver signal includes information showing the angle (rotational phase) of the SR motor 1.

The control device 100 calculates the rotational speed of the SR motor 1 based on the resolver signal (sensor value) read in Step S1 (Step S2), and derives a motor torque command value according to the demanded torque (Step S3). Additionally, the control device 100 determines the operation point of the SR motor 1 based on the motor rotational speed calculated in Step S2 and the motor torque command value derived in Step S3. In the processing, a demanded torque value may be used instead of the motor torque command value. That is, the operation point of the SR motor 1 may be determined based on the demanded torque value of the SR motor 1 and the rotational speed of the SR motor 1.

The control device 100 determines whether or not there is a need to drop the applied voltage (Step S4). The control device 100 determines whether or not the operation point of the SR motor 1 is within the low-load region of the map illustrated in FIG. 2. For example, in a case where the operation point of the SR motor 1 is within a region closer to the low-load side than the voltage drop switching line $A_0$, the determination is affirmatively made in Step S4.

In a case where the determination is affirmatively made in Step S4 because there is a need to drop the applied voltage lower (Step S4: Yes), the control device 100 determines the voltage at the time of voltage drop (Step S5). For example, in a case where the applied voltage at the normal time is set in advance to 600 V and the applied voltage at the time of voltage drop is set in advance to 300 V, the control device 100 selects the applied voltage 300 V at the time of voltage drop as an applied voltage value.

Additionally, in a case where the applied voltage is dropped, the control device 100 determines whether or not there is a need to expand the excitation width of the current (Step S6). For example, determination is made whether or not the operation point of the SR motor 1 is within the region closer to the low-load side than the drive region (operation point) where the determination is affirmatively made in Step S4. In a case where the operation point of the SR motor 1 is within the region closer to the low-load side than the excitation width switching line $A_1$, the determination is affirmatively made in Step S6.

In a case where the determination is affirmatively made in Step S6 because there is a need to expand the excitation width of the current (Step S6: Yes), the control device 100 executes the second voltage drop control, drops the applied voltage, and expands the excitation width of the current more than the normal width (Step S7). In Step S7, a subroutine illustrated in FIG. 6 to be described below is executed. Then, the control device 100 ends the drive control flow after executing Step S7.

In a case where the determination is negatively made in Step S6 because there is no need to expand the excitation width of the current (Step S6: No), the control device 100 executes the first voltage drop control, drops the applied voltage, and controls the excitation width of the current to the normal width (Step S8). In Step S8, a subroutine illustrated in FIG. 5 to be described below is executed. Then, the control device 100 ends the drive control flow after executing Step S8.

Meanwhile, in a case where the determination is negatively made in Step S4 because there is no need to drop the applied voltage (Step S4: No), the control device 100 executes the normal control, applies the normal voltage to the SR motor 1, and controls the excitation width of the current to the normal width (Step S9). In Step S9, a subroutine illustrated in FIG. 4 to be described below is executed. Then, the control device 100 ends the drive control flow after executing Step S9.

Figure 7:
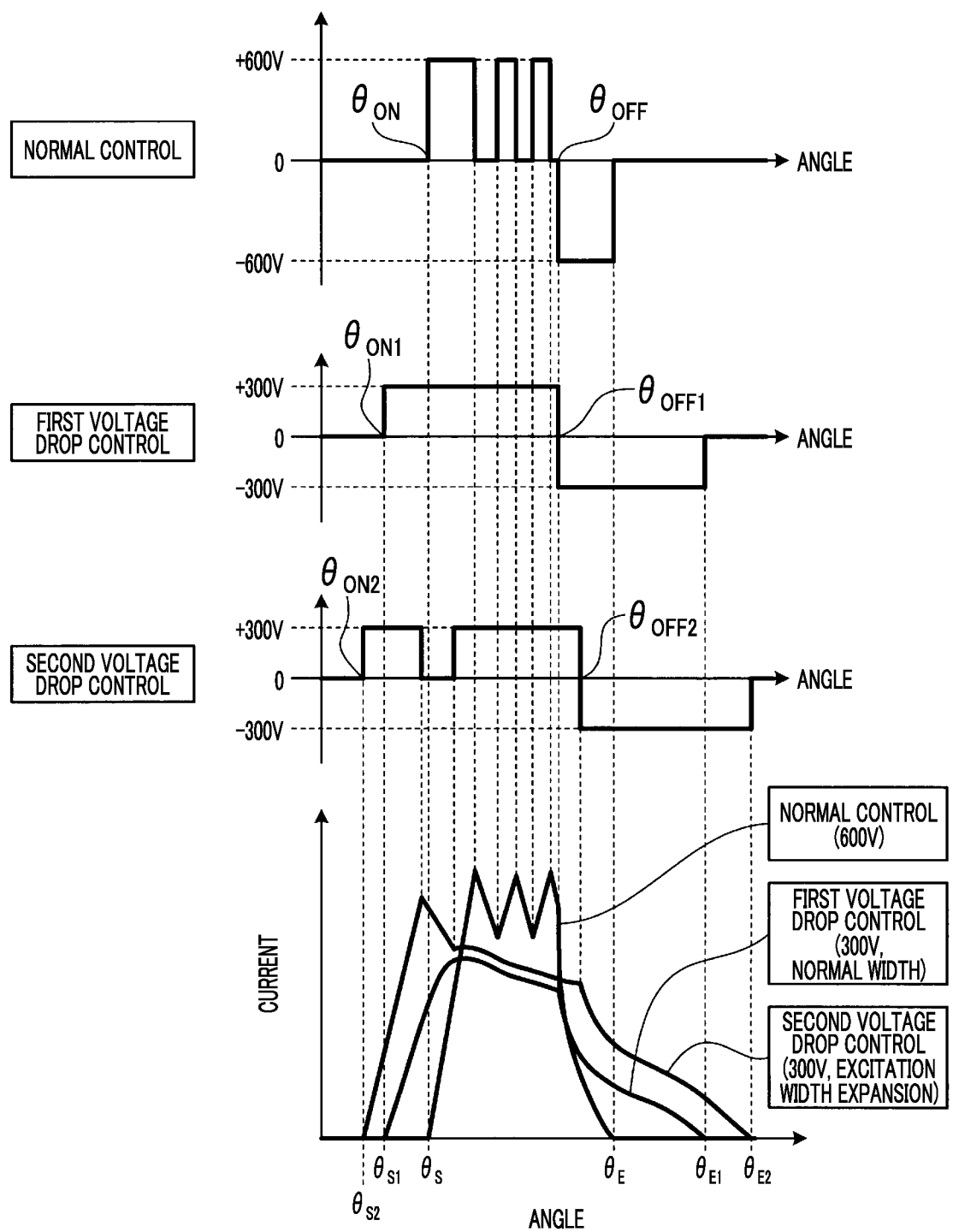
FIG. 7 is a view illustrating voltage waveforms and current waveforms in the normal control, the first voltage drop control, and the second voltage drop control.

By executing the above-described drive control flow, the three control modes (the normal control, the first voltage drop control and the second voltage drop control) are switched. An example of voltage waveforms and current waveforms to be realized by the SR motor 1 when the respective control modes are executed is illustrated in FIG. 7. In a case where the normal control is executed (in a case where there is no voltage drop and the excitation width is normal), a voltage waveform and a current waveform illustrated in FIG. 7 are obtained. In a case where the first voltage drop control is executed (in a case where there is voltage drop and the excitation width is normal), a voltage waveform and a current waveform illustrated in FIG. 7 are obtained. In a case where the second voltage drop control is executed (in a case where there is voltage drop and the excitation width is expanded), a voltage waveform and a current waveform illustrated in FIG. 7 are obtained.

4. Normal Control

A normal control will be described. First, the voltage waveform and the current waveform of the normal control will be described with reference to FIG. 7, and next, a normal control flow will be described with reference to FIG. 4. As illustrated in FIG. 7, the applied voltage at the normal time is set to 600 V.

4-1. Voltage Waveform and Current Waveform

As illustrated in FIG. 7, the control device 100 begins to cause a current to a coil 12 used as an excitation target, in a case where the angle of a certain rotor tooth 21 enters an excitation interval, that is, in a case where an excitation start angle $\theta_S$ (ON angle $\theta_{ON}$) is reached. In a case where the angle of the rotor tooth 21 is within a current rising interval, that is, in a case where there is a need to raise the current, the control device 100 performs rising control of the current to the coil 12 of a stator tooth 11 used as the excitation target. In the current rising interval, the control mode (positive voltage mode) of applying a positive voltage is executed, and a current value is raised to a maximum current value $I_{max}$. In a hysteresis interval after reaching the maximum current value $I_{max}$, the control (switching control) of repeating the positive voltage mode and the control mode (reflux mode) of setting the voltage to 0 V is executed, and the current value is controlled so as to have a magnitude in the vicinity of the maximum current value $I_{max}$. The reflux mode is a control mode in which the current is refluxed within the inverter circuit via the coil 12 without applying the voltage to the coil 12. Specifically, the control device 100 controls the current value such that the current value changes within a range of a predetermined current width having the maximum current value $I_{max}$ as an upper limit value within the hysteresis interval. In this case, in a case where the current value reaches the maximum current value $I_{max}$, the reflux mode is executed, and thereafter, in a case where the current value reaches a lower limit value of the predetermined current width, the positive voltage mode is executed. Alternatively, the control device 100 executes the positive voltage mode in a case where the current value is smaller than a limit current value $I_\alpha$, and executes the reflux mode in a case where the current value is equal to or larger than the limit current value $I_\alpha$. The limit current value $I_\alpha$ is set in advance to a value smaller than the maximum current value $I_{max}$ and larger than the lower limit value of the predetermined current width. Then, when the angle of the rotor tooth 21 reaches an OFF angle $\theta_{OFF}$, that is, in a case where the angle exits the excitation interval, the current flowing through the coil 12 of the stator tooth 11 as the excitation target begins to decrease. In the current decrease interval, the control device 100 executes a mode (negative voltage mode) in which a negative voltage is applied. In this way, an angle range from the ON angle $\theta_{ON}$ to the OFF angle $\theta_{OFF}$ is the excitation interval of the normal control. That is, the excitation interval in the embodiment is an angle range where a magnetic flux that contributes to generation of the demanded torque from the stator tooth 11 and the coil 12 as the excitation target is positively generated. Thereafter, a current flowing through the coil 12 at an excitation end angle $\theta_E$ reaches zero. In the normal control, the current continues flowing in an angle range from the excitation start angle $\theta_S$ to the excitation end angle $\theta_E$. The excitation width in the embodiment is an interval where the current is caused to flow to the coil 12. That is, the excitation width of the normal control is the angle range from the excitation start angle $\theta_S$ to the excitation end angle $\theta_E$. The excitation width ($\theta_S$ to $\theta_E$) of the normal control is the normal excitation width.

4-2. Normal Control Flow

Figure 4:
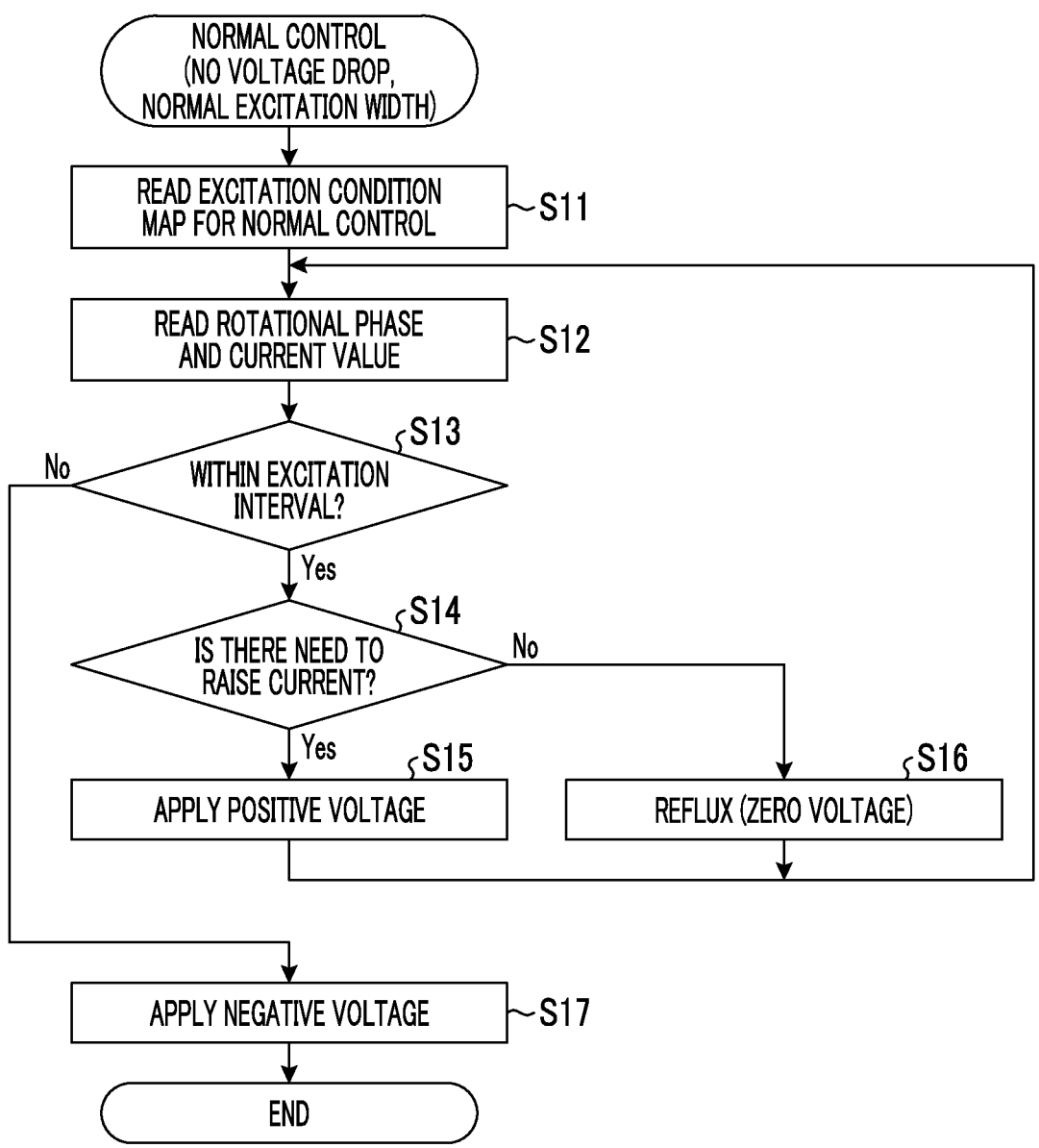
FIG. 4 is a flowchart illustrating an example of a normal control flow.

FIG. 4 is a flowchart illustrating an example of the normal control flow. In a case where the normal control flow illustrated in FIG. 4 is executed, the applied voltage is determined to the normal voltage (a normal voltage value without a voltage drop).

The control device 100 reads an excitation condition map for the normal control (Step S11). The excitation start angle $\theta_S$ (ON angle $\theta_{ON}$), the OFF angle $\theta_{OFF}$, the excitation end angle $\theta_E$, and the maximum current value $I_{max}$ (limit current value $I_\alpha$) are included in excitation conditions of the normal control. The excitation conditions are set in advance.

Additionally, the control device 100 reads the angle (rotational phase) of the rotor 20 and the current value of the SR motor 1 (Step S12). The control device 100 reads a current value (instantaneous current value) that is actually flowing to a coil 12 of a certain phase based on a detection signal from a current sensor (not illustrated). The current sensor detects the current value flowing to the coil 12, and is configured to detect the current value regarding the coil 12 of each phase. Additionally, the control device 100 reads the angle (rotational phase) of the rotor 20 based on the resolver signal from the rotational speed sensor 51.

Then, the control device 100 determines whether or not the rotor tooth 21 is within the excitation interval based on the rotational phase of the rotor 20 (Step S13). In a case where the rotor tooth 21 is within an angle range from the ON angle $\theta_{ON}$ to the OFF angle $\theta_{OFF}$, the determination is affirmatively made in Step S13. That is, a case where the angle of the rotor tooth 21 is within the current rising interval and a case where the angle of the rotor tooth 21 is within the hysteresis interval are included in the case where the determination is affirmatively made in Step S13.

In a case where the determination is affirmatively made in Step S13 because the rotor tooth 21 is within the excitation interval (Step S13: Yes), the control device 100 determines whether or not there is a need to raise the current (Step S14). The interval in which there is a need to raise the current is an interval where the current is raised within the current rising interval or within the hysteresis interval. In the case of the hysteresis interval, in a case where the current value is smaller than the limit current value $I_\alpha$ (or in a case where the current value reaches the lower limit value of the predetermined current width), the determination is affirmatively made in Step S14.

In a case where the determination is affirmatively made in Step S14 because there is a need to raise the current (Step S14: Yes), the control device 100 executes the positive voltage mode and applies the positive voltage to the coil 12

(Step S15). The positive voltage value is a normal voltage value without a voltage drop. In a case where the applied voltage at the normal time is set in advance to 600 V, the positive voltage of 600 V is applied to the SR motor 1. For example, in the case of the current rising interval, the current value during rising does not reach the maximum current value $I_{max}$, and the positive voltage mode is continued in Step S15. On the other hand, in the case of the hysteresis interval, the current value that has decreased from the maximum current value $I_{max}$ becomes lower (or the current value reaches the lower limit value of the predetermined current width) than the limit current value $I_\alpha$, the reflux mode is ended in Step S15 and the positive voltage mode is started. Then, the control device 100 returns to the above-described Step S12 after executing Step S15.

In a case where the determination is negatively made in Step S14 because there is no need to raise the current (Step S14: No), the control device 100 executes the reflux mode and sets the voltage to be applied to the coil 12 to 0 V (Step S16). In the case of the current rising interval, the current value during rising reaches the maximum current value $I_{max}$, the positive voltage mode is ended in Step S16, and the reflux mode is started. That is, the transition from the current rising interval to the hysteresis interval is made. On the other hand, in the case of the hysteresis interval, the current value during rising exceeds the limit current value $I_\alpha$, the positive voltage mode is ended in Step S16, and the reflux mode is started. Then, the control device 100 returns to the above-described Step S12 after executing Step S16.

On the other hand, in a case where the determination is negatively made in Step S13 because the rotor tooth 21 is not within the excitation interval (Step S13: No), the control device 100 executes the negative voltage mode, and applies the negative voltage to the SR motor 1 (Step S17). The negative voltage value is a normal voltage value without voltage drop. In a case where the applied voltage at the normal time is set in advance to 600 V, the negative voltage of 600 V is applied to the SR motor 1. Then, the control device 100 ends the subroutine after executing Step S17.

5. First Voltage Drop Control

The first voltage drop control will be described. First, the voltage waveform and the current waveform of the first voltage drop control will be described with reference to FIG. 7, and next, a first voltage drop control flow will be described with reference to FIG. 5. As illustrated in FIG. 7, the applied voltage at the time of voltage drop is set to 300 V.

5-1. Voltage Waveform and Current Waveform

As illustrated in FIG. 7, in the first voltage drop control, compared to the current waveform of the normal control, an excitation start angle $\theta_{S1}$ (ON angle $\theta_{ON1}$) appears earlier and an excitation end angle $\theta_{E1}$ appears later. Specifically, the excitation width of the first voltage drop control is an angle range from the excitation start angle $\theta_{S1}$ to the excitation end angle $\theta_{E1}$. The excitation start angle $\theta_{S1}$ of the first voltage drop control is smaller than the excitation start angle $\theta_S$ of the normal control and is larger than an excitation start angle $\theta_{S2}$ of the second voltage drop control to be described below. The excitation end angle $\theta_{E1}$ of the first voltage drop control is larger than the excitation end angle $\theta_E$ of the normal control and is smaller than an excitation end angle $\theta_{E2}$ of the second voltage drop control to be described below. Additionally, a maximum current value $I_{max1}$ of the first voltage drop control is smaller than the maximum current value $I_{max}$ of the normal control.

Although the excitation width ($\theta_{S1}$ to $\theta_{E1}$) of the first voltage drop control is an angle range wider than the excitation width ($\theta_S$ to $\theta_E$) of the normal control, this does not mean that the excitation width increases to reduce the vibration and the noise. This is for satisfying the demanded torque. In detail, since the voltage (300 V) dropped to be lower than the normal voltage (600 V) is applied in the first voltage drop control, the excitation width of the current should be expanded to satisfy the demanded torque (demanded power) and to compensate for a voltage equivalent to the voltage drop of the applied voltage. As a result of realizing the current waveform capable of satisfying the demanded torque (demanded power) in this way, the excitation width of the first voltage drop control is wider than the excitation width of the normal control. That is, the excitation width of the first voltage drop control can be referred to as a normal width when voltage drop is executed.

Additionally, since the applied voltage is dropped in the first voltage drop control, switching control of the inverter 2 is not executed in the hysteresis interval within the excitation interval. Specifically, with reference to FIG. 7, the current waveform of the normal control will be compared with the current waveform of the first voltage drop control. In the normal control, the current value necessarily rises when the positive voltage (+600 V) is applied. On the other hand, since the dropped voltage (300 V) is applied in the first voltage drop control, the current value decreases even if the positive voltage (+300 V) continues to be applied after the current value reaches the maximum current value $I_{max1}$. For that reason, in the first voltage drop control, there is no need to execute the switching control of the inverter 2 in the hysteresis interval. Additionally, in the first voltage drop control, the positive voltage mode continues to be executed in order to suppress abrupt decrease of the current value within an excitation interval ($\theta_{ON1}$ to $\theta_{OFF1}$). That is, at the time of the first voltage drop control, the control is executed in a current waveform in which the current value continues to decrease slowly in a state where the positive voltage is applied. As illustrated in FIG. 7, the current waveform in which the current value continues to decrease in a state where the positive voltage is applied (positive voltage mode) is a current waveform in which the current decreases more slowly than a current waveform in a state where the negative voltage is applied (negative voltage mode). In this way, in the first voltage drop control, there is no need for the switching control of the inverter 2 in the hysteresis interval. Therefore, switching loss can be reduced, and efficiency can be improved.

5-2. First Voltage Drop Control Flow

Figure 5:
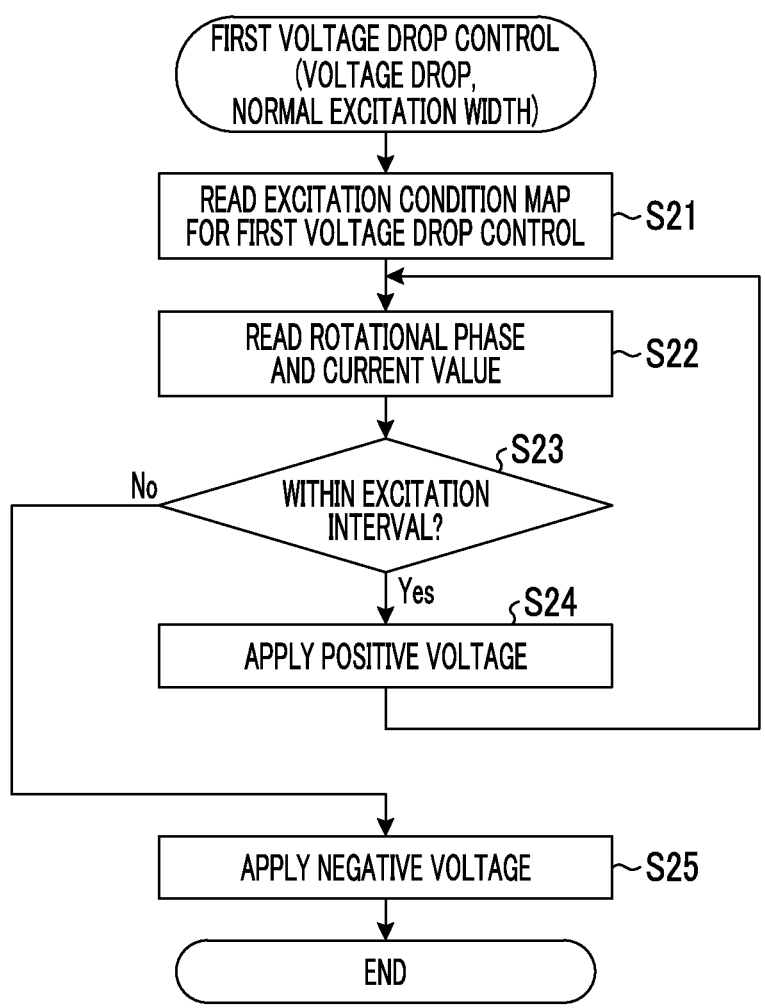
FIG. 5 is a flowchart illustrating an example of a first voltage drop control flow.

FIG. 5 is a flowchart illustrating an example of the first voltage drop control flow. In a case where the first voltage drop control flow illustrated in FIG. 5 is executed, the applied voltage (the voltage at the time of voltage drop) is determined in the above-described Step S5.

As illustrated in FIG. 5, the control device 100 reads an excitation condition map for the first voltage drop control (Step S21). Excitation conditions according to the voltage are determined in Step S21. The excitation start angle $\theta_{S1}$ (ON angle $\theta_{ON1}$), the OFF angle $\theta_{OFF1}$, the excitation end angle $\theta_{E1}$, and the maximum current value $I_{max1}$ are included in the excitation conditions of the first voltage drop control. The excitation conditions are set in advance.

The control device 100 reads the current value of the SR motor 1 and the angle (rotational phase) of the rotor 20 (Step S22). Step S22 is the same processing as Step S12 illustrated in the above-described FIG. 4.

Then, the control device 100 determines whether or not the rotor tooth 21 is within the excitation interval based on the rotational phase of the rotor 20 (Step S23). In a case where the rotor tooth 21 is within an angle range from the ON angle $\theta_{ON1}$ to the OFF angle $\theta_{OFF1}$, the determination is affirmatively made in Step S23.

In a case where the determination is affirmatively made in Step S23 because the rotor tooth 21 is within the excitation interval (Step S23: Yes), the control device 100 executes the positive voltage mode and applies the positive voltage to the SR motor 1 (Step S24). The positive voltage value is a dropped voltage value (+300 V). The positive voltage of 300 V is applied to the SR motor 1 in Step S24. Then, the control device 100 returns to the above-described Step S22 after executing Step S24.

On the other hand, in a case where the determination is negatively made in Step S23 because the rotor tooth 21 is not within the excitation interval (Step S23: No), the control device 100 executes the negative voltage mode, and applies the negative voltage to the SR motor 1 (Step S25). The negative voltage value is a dropped voltage value (−300 V). The negative voltage of 300 V is applied to the SR motor 1 in Step S25. Then, the control device 100 ends the subroutine after executing Step S25.

6. Second Voltage Drop Control

The second voltage drop control will be described. First, the voltage waveform and the current waveform of the second voltage drop control will be described with reference to FIG. 7, and next, a second voltage drop control flow will be described with reference to FIG. 6. As illustrated in FIG. 7, the applied voltage at the time of voltage drop is set to 300 V.

6-1. Voltage Waveform and Current Waveform

As illustrated in FIG. 7, in the second voltage drop control, in order to expand the excitation width, compared to the current waveform of the first voltage drop control, an excitation start angle $\theta_{S2}$ (ON angle $\theta_{ON2}$) appears earlier and an excitation end angle $\theta_{E2}$ appears later. Accordingly, the excitation width ($\theta_{S2}$ to $\theta_{E2}$) of the second voltage drop control is an angle range wider than the excitation width ($\theta_{S2}$ to $\theta_{E1}$) of the first voltage drop control.

Specifically, the excitation interval of the second voltage drop control is an angle range from the excitation start angle $\theta_{S2}$ to the excitation end angle $\theta_{E2}$. The excitation start angle $\theta_{S2}$ of the second voltage drop control is smaller than the excitation start angle $\theta_{S1}$ of the first voltage drop control. The excitation end angle $\theta_{E2}$ of the second voltage drop control is larger than the excitation end angle $\theta_{E1}$ of the first voltage drop control. Additionally, the excitation width of the second voltage drop control has a current waveform of which the excitation width is relatively widest among the three control modes, as a result of executing the control of positively expanding the excitation width.

Additionally, since the applied voltage is dropped in the second voltage drop control, the hysteresis interval is not provided within the excitation interval. Here, with reference to FIG. 7, the current waveform of the first voltage drop control will be compared with the current waveform of the second voltage drop control. In the second voltage drop control, the rising of the current becomes steep because the excitation start angle $\theta_{S2}$ appears earlier than the first voltage drop control. For that reason, the maximum current value $I_{max2}$ of the second voltage drop control is larger than the maximum current value $I_{max1}$ of the first voltage drop control. In the second voltage drop control, in order to expand the excitation width more than that of the first voltage drop control, the reflux mode is executed when the current value reaches the maximum current value $I_{max2}$. Then, in the second voltage drop control, when a predetermined angle of progress is made from an angle at which the reflux mode is started, the positive voltage mode is executed in order to suppress abrupt decrease of the current. In the second voltage drop control, in a case where there is a need to suppress abrupt decrease of the current value within the excitation interval ($\theta_{ON2}$ to $\theta_{OFF2}$), the positive voltage mode continues to be executed. As illustrated in FIG. 7, since the dropped voltage (300 V) is applied in the second voltage drop control, the current value decreases even if the positive voltage (+300 V) continues to be applied after executing the reflux mode (after setting the applied voltage to 0 V). That is, at the time of the second voltage drop control, the control is executed in a current waveform in which the current value continues to decrease slowly in a state where the positive voltage is applied. In detail, the current waveform in which the current value continues to decrease in a state (positive voltage mode) where the positive voltage is applied at the time of the second voltage drop control is a current waveform in a state (reflux mode) where the applied voltage is 0 V, or a current waveform in which the current decreases more slowly than a current waveform in a state (negative voltage mode) where the negative voltage is applied. In this way, also in the second voltage drop control, the number of times of switching of the inverter 2 can be made small as in the first voltage drop control. For that reason, in the second voltage drop control, switching loss can be reduced, and efficiency can be improved.

6-2. Second Voltage Drop Control Flow

Figure 6:
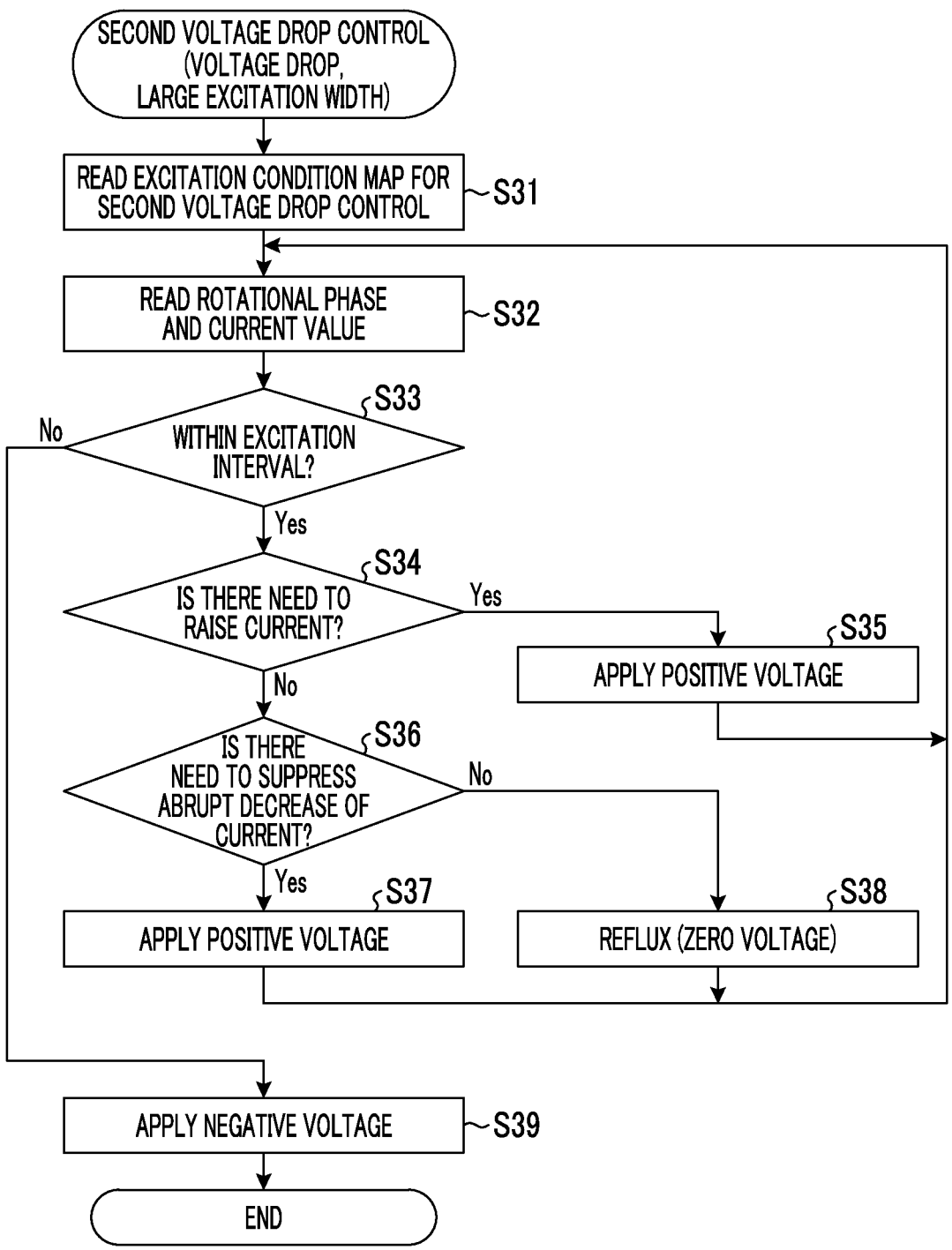
FIG. 6 is a flowchart illustrating an example of a second voltage drop control flow.

FIG. 6 is a flowchart illustrating an example of the second voltage drop control flow. In a case where the second voltage drop control flow illustrated in FIG. 6 is executed, the applied voltage (the voltage at the time of voltage drop) is determined in the above-described Step S5.

As illustrated in FIG. 6, the control device 100 reads an excitation condition map for the second voltage drop control (Step S31). The excitation start angle $\theta_{S2}$ (ON angle $\theta_{ON2}$), the OFF angle $\theta_{OFF2}$, the excitation end angle $\theta_{E2}$, and the maximum current value $I_{max2}$ are included in the excitation conditions of the second voltage drop control. The excitation conditions are set in advance.

Additionally, the control device 100 reads the current value of the SR motor 1 and the angle (rotational phase) of the rotor 20 (Step S32). Step S32 is the same processing as Step S12 illustrated in the above-described FIG. 4.

Then, the control device 100 determines whether or not the rotor tooth 21 is within the excitation interval based on the rotational phase of the rotor 20 (Step S33). In a case where the rotor tooth 21 is within an angle range from the ON angle $\theta_{ON2}$ to the OFF angle $\theta_{OFF2}$, the determination is affirmatively made in Step S33.

In a case where the determination is affirmatively made in Step S33 because the rotor tooth 21 is within the excitation interval (Step S33: Yes), the control device 100 determines whether or not there is a need to raise the current (Step S34).

The interval in which there is a need to raise the current is within the current rising interval. For example, in a case where the current value is increasing to the maximum current value $I_{max2}$ after the angle of the rotor tooth 21 reaches the excitation start angle $\theta_{S2}$, the determination is affirmatively made in Step S34.

In a case where the determination is affirmatively made in Step S34 because there is a need to raise the current (Step S34: Yes), the control device 100 executes the positive voltage mode and applies the positive voltage to the SR motor 1 (Step S35). The positive voltage value is a dropped voltage value (+300 V). The positive voltage of 300 V is applied to the SR motor 1 in Step S35. Then, the control device 100 returns to the above-described Step S32 after executing Step S35.

In a case where the determination is negatively made in Step S34 because there is no need to raise the current (Step S34: No), the control device 100 determines whether or not there is a need to suppress abrupt decrease of the current (Step S36).

In a case where the determination is affirmatively made in Step S36 because there is a need to suppress abrupt decrease of the current (Step S36: Yes), the control device 100 executes the positive voltage mode and applies the positive voltage to the SR motor 1 (Step S37). The positive voltage of 300 V is applied to the SR motor 1 in Step S37. Then, the control device 100 returns to the above-described Step S32 after executing Step S37.

In a case where the determination is negatively made in Step S36 because there is no need to suppress abrupt decrease of the current (Step S36: No), the control device 100 executes the reflux mode and sets the voltage to be applied to the SR motor 1 to 0 V (Step S38). In the case of the current rising interval, the current value during rising reaches the maximum current value $I_{max2}$, the positive voltage mode is ended in Step S38, and the reflux mode is started. Then, the control device 100 returns to the above-described Step S32 after executing Step S38.

On the other hand, in a case where the determination is negatively made in Step S33 because the rotor tooth 21 is not within the excitation interval (Step S33: No), the control device 100 executes the negative voltage mode, and applies the negative voltage to the SR motor 1 (Step S39). The negative voltage value is a dropped voltage value (−300 V). The negative voltage of 300 V is applied to the SR motor 1 in Step S39. Then, the control device 100 ends the subroutine after executing Step S39.

7. Radial Force Fluctuation

Figure 8:
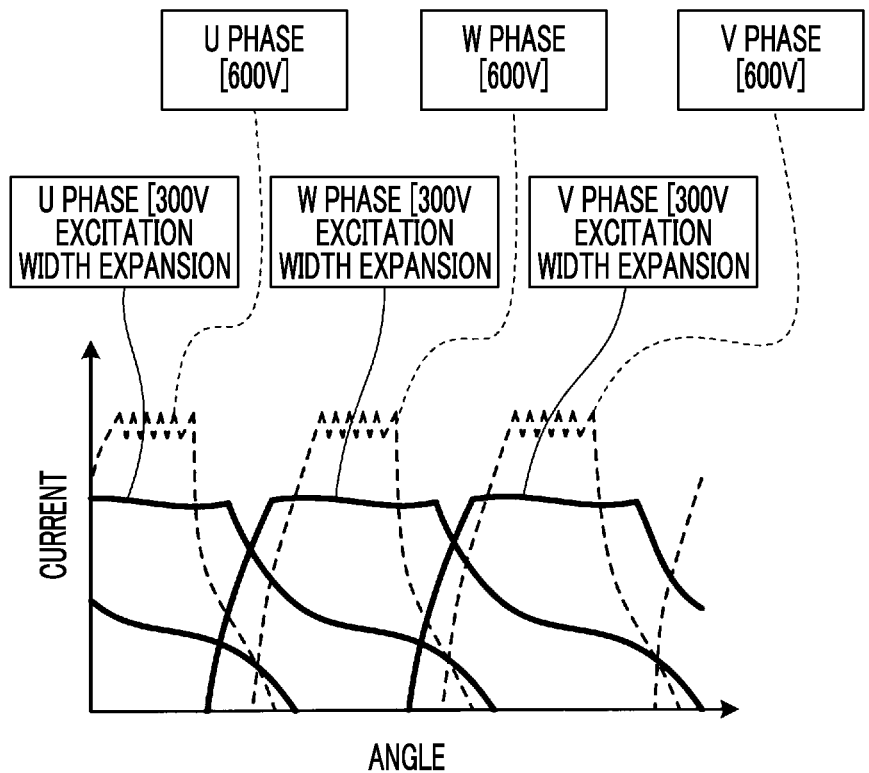
FIG. 8 is a view illustrating three-phase current waveforms of the normal control and the second voltage drop control.
Figure 9:
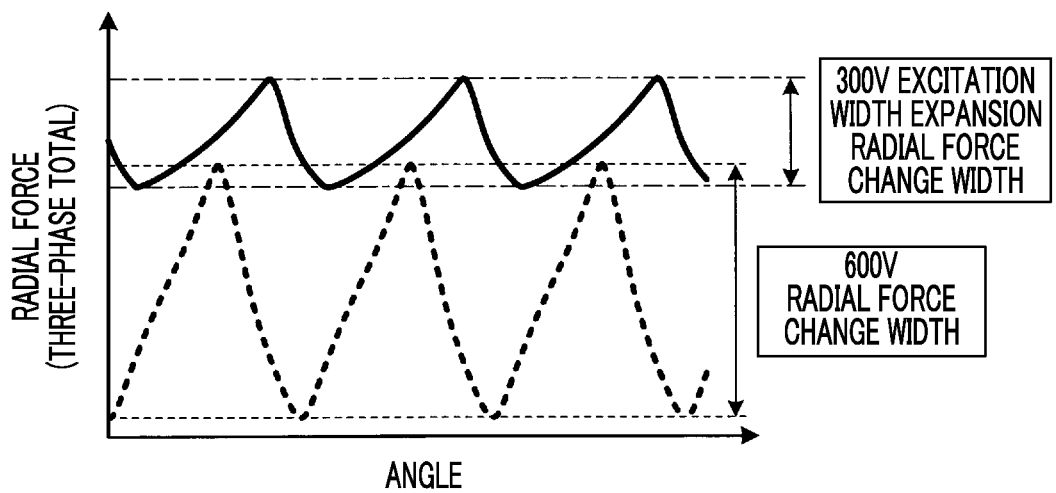
FIG. 9 is a view for comparing and describing radial force fluctuations of the normal control and the second voltage drop control.

Here, with reference to FIG. 8 and FIG. 9, differences in radial force fluctuation between a case where the second voltage drop control is executed and a case where the normal control is executed will be described in comparison. In FIG. 8, three-phase current waveforms of the second voltage drop control are illustrated by solid lines, and three-phase current waveforms of the normal control are illustrated by dashed lines. In FIG. 9, radial force change widths of the second voltage drop control are illustrated by solid lines, and radial force change widths of the normal control are illustrated by dashed lines.

As illustrated in FIG. 8, in the second voltage drop control, the excitation width of each phase becomes wider by dropping the applied voltage. Therefore, in the three-phase current waveforms, intervals (angle ranges) where the excitation widths of different phases overlap each other are widely present. Accordingly, as seen from the overall three-phase current waveforms, in the second voltage drop control, the change width (amplitude) of the current becomes narrow, and the change in the current becomes slow. On the other hand, the three-phase current waveforms of the normal control have narrow angle ranges where the excitation widths of different phases overlap each other. Accordingly, as seen from the overall three-phase current waveforms, in the normal control, the change width (amplitude) of the current becomes wide, and the change in the current becomes steep. As a result, as illustrated in FIG. 9, there are differences in radial force fluctuation between the second voltage drop control and the normal control.

In the second voltage drop control, as seen from the overall three-phase current waveforms, the change in the radial force become slow because many angle ranges (intervals) where the change in the current is slow are present, and the change width (amplitude) of the radial force is narrow because the change width of the current is narrow. On the other hand, in the normal control, compared to a case where the second voltage drop control is executed, the change in the radial force is steeper and the change width (amplitude) of the radial force is wider. The radial force change width represents the magnitude of the radial force fluctuation. That is, in a case where the second voltage drop control is executed, compared to a case where the normal control is executed, the change in a vibratory force (radial force) is slow and the change width of the vibratory force (radial force) becomes narrow. Therefore, the vibration and the noise of the SR motor 1 can be reduced.

As described above, in the control device 100 of the embodiment, the dropped voltage is applied to the SR motor 1 when the SR motor 1 is driven in the low-load region. Therefore, the current varies slowly, and the change width of the current becomes narrow. Accordingly, the fluctuation of the vibratory force at the time of low load can be suppressed, and the noise and the vibration can be reduced.

The present disclosure is not limited to the above-described embodiment.

For example, in Step S5 illustrated in the above-described FIG. 3, the voltage at the time of voltage drop can be determined based on an available range of the voltage. The available range of the voltage is determined in a currently available range based on a state of charge (SOC) of the battery 4, drive states of other electrical devices connected to the battery 4, or the like. In this case, in a case where 300 V is not included in the available range of the voltage even if the voltage at the time of voltage drop is set in advance to 300 V, 300 V is not selected as the voltage value at the time of voltage drop, and a predetermined voltage (a voltage lower than 600 V that is the normal voltage) within the currently available range is determined as the voltage at the time of voltage drop.

Additionally, the subroutines illustrated in the above-described FIGS. 4 to 6 are examples. For example, the subroutine of the normal control illustrated in FIG. 4 may be executed as a subroutine of the first voltage drop control and the second voltage drop control. In this case, the subroutine of the first voltage drop control is configured to perform Step S12 to Step S17 in FIG. 4 instead of Step S22 to Step S25 in FIG. 5. Additionally, the subroutine of the second voltage drop control is configured to perform Step S12 to Step S17 in FIG. 4 instead of Step S32 to Step S39 in FIG. 6. In short, the drive control of the SR motor 1 may be configured such that different excitation conditions (the excitation start angle, the OFF angle, the excitation end angle, and the maximum current value) are determined according to the applied voltage (the presence/absence of voltage drop).

Moreover, the current waveform of the normal control illustrated in the above-described FIG. 7 is an example. For example, the current waveform of the normal control may be a waveform in which the negative voltage mode is executed and the current decreases, after the current decreases slowly as the reflux mode continues to be executed in a predetermined angle range after exiting the hysteresis interval within the excitation interval. In this way, in a case where the reflux mode is executed after the hysteresis interval, an angle (reflux start angle) at which the reflux mode is started is included in the above-described excitation conditions.

8. First Modification Example

As a first modification example, the control device 100 can be configured to execute the control (voltage drop gradual change control) of gradually dropping the applied voltage as the operation point of the SR motor 1 moves from the high-load side to the low-load side. Here, the control device 100 of the first modification example will be described with reference to FIG. 10A and FIG. 10B. In the description of the first modification example, description will be omitted regarding the same component configuration as those of the above-described embodiment.

Figure 10A:
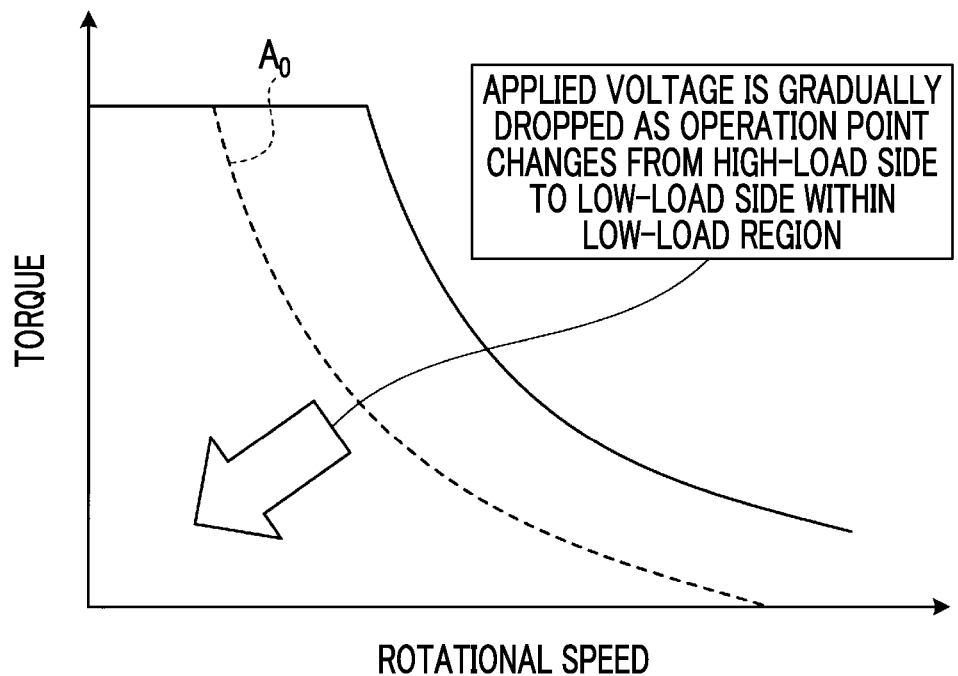
FIG. 10A is an N-T diagram of the switched reluctance motor for describing voltage drop gradual change control.
Figure 10B:
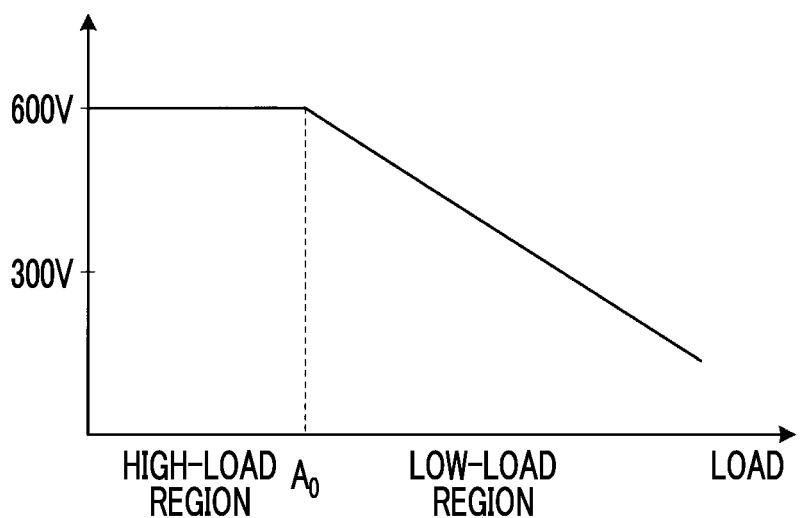
FIG. 10B is a view for describing changes in voltage when the voltage drop gradual change control is executed.

FIG. 10A is an N-T diagram of the SR motor 1 for describing the voltage drop gradual change control. FIG. 10B is a view for describing changes in voltage when the voltage drop gradual change control is executed. As illustrated in FIG. 10A and FIG. 10B, the control device 100 of the first modification example executes the voltage drop gradual change control, and continuously drops the applied voltage such that the voltage drop amount of the applied voltage become gradually large as the movement (change) from an operation point on a relatively high-load side to an operation point on a relatively low-load side is made in a case where the operation point of the SR motor 1 is within a region closer to the low-load side of the voltage drop switching line $A_0$. For example, when the control device 100 executes the voltage drop gradual change control in a case where the applied voltage at the normal time is 600 V, the applied voltage decreases gradually from 600 V. Additionally, it is possible for the control device 100 to control the voltage drop unit 3 to gradually drop the applied voltage.

Moreover, the control device 100 of the first modification example can execute the control (excitation width gradual change control) of gradually changing the excitation width of the current as well as the voltage drop amount of the voltage. That is, in the first modification example, as the operation point of the SR motor 1 moves (changes) from the high-load region to the low-load region, the applied voltage is gradually dropped and the excitation width of the current is gradually expanded. For example, in a case where the applied voltage at the normal time is 600 V, the control device 100 executes a control such that the excitation width of the current becomes gradually wide as the applied voltage is gradually lowered from 600 V. Alternatively, the control device 100 is configured to execute the control of gradually expanding the excitation width of the current after the applied voltage is gradually dropped from 600 V to a predetermined voltage. In addition, a case where the operation point is moving (changing) further to the low-load side than the operation point of the SR motor 1 when the applied voltage begins to be dropped is included as an execution condition of the excitation width gradual change control.

9. Second Modification Example

Figure 11:
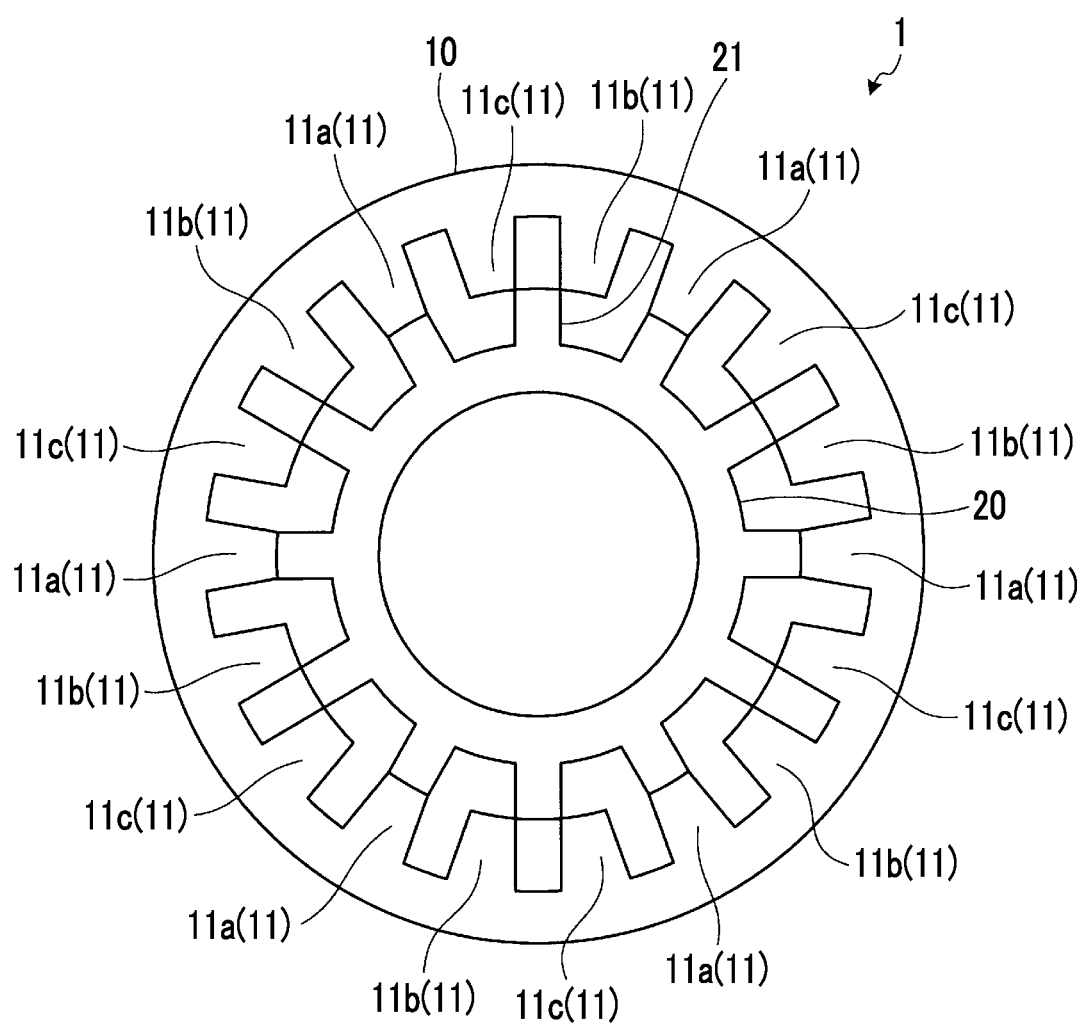
FIG. 11 is a view schematically illustrating a modification example of the switched reluctance motor.

As a second modification example, the SR motor 1 can be configured such that a combination of the number of poles of the stator 10 and the number of poles of the rotor 20 becomes a multiple of six poles/four poles. For example, the SR motor 1 may be constituted of a structure having a 12-pole stator 10 and an 8-pole rotor 20. Additionally, as illustrated in FIG. 11, the SR motor 1 may be constituted by a structure having an 18-pole stator 10 and a 12-pole rotor 20. Alternatively, the SR motor 1 may be constituted of a structure having a 24-pole stator 10 and a 16-pole rotor 20.

10. Applicable Vehicle

The SR motor 1 is capable of being mounted on a vehicle as a driving power source. In a case where the SR motor 1 is mounted on a vehicle, in Step S1 of the above-described FIG. 3, information, including an accelerator operation amount signal input from an accelerator operation amount sensor, a speed signal input from a vehicle speed sensor, and the like, is read. Additionally, in Step S3 of FIG. 3, a demanded torque is calculated using the accelerator operation amount signal, the speed signal, and a predetermined map for the demanded torque, and the motor torque command value according to the demanded torque is derived.

Figure 12:
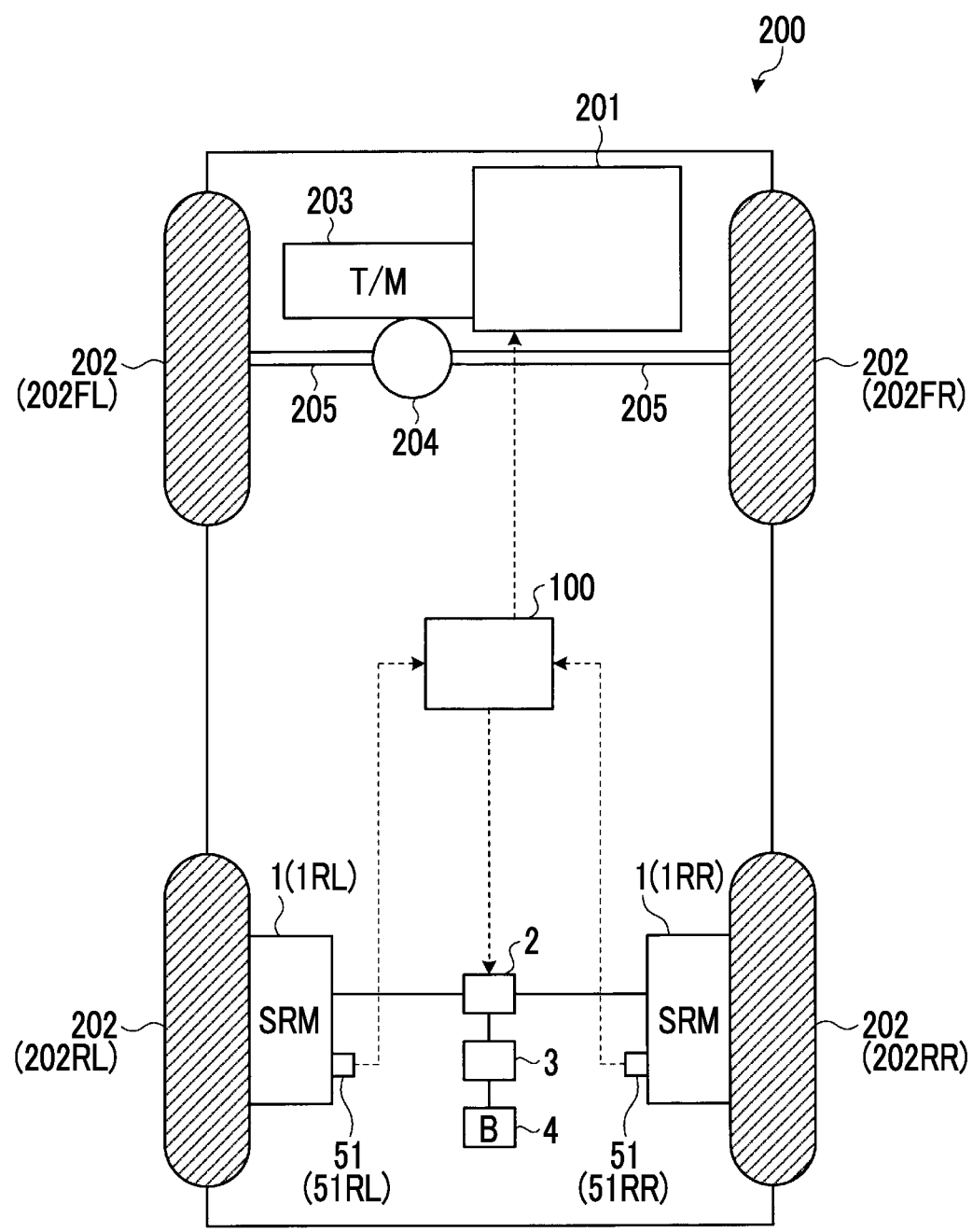
FIG. 12 is a skeleton view illustrating an example of an applicable vehicle.

FIG. 12 is a skeleton view illustrating an example of an applicable vehicle. A vehicle 200 illustrated in FIG. 12 includes an engine 201, wheels 202, a transmission (T/M) 203, a differential gear 204, a driving shaft 205, and the SR motor 1 serving as the driving power source. The vehicle 200 is a four-wheel drive vehicle, the engine 201 drives right and left front wheels 202FR, 202FL, and the SR motor 1 that is a rear motor drives right and left rear wheels 202RR, 202RL.

The engine 201 is a well-known internal combustion engine. In a front-side drive device of the vehicle 200, the engine 201 is connected to right and left driving shafts 205 via the transmission 203 and the differential gear 204. The transmission 203 is, for example, a stepped or stepless automatic transmission, and a manual transmission. One of the right and left driving shafts 205 is connected to the front left wheel 202FL, and the other thereof is connected to the front right wheel 202FR. The front wheels 202FR, 202FL are driven by the output torque (engine torque) of the engine 201. The vehicle 200 may include a motor generator (MG) that drives the front wheels 202FR, 202FL, in addition to the engine 201.

The SR motor 1 is a so-called in-wheel motor, and is provided in each of the right and left rear wheels 202RR, 202RL. In the rear-side drive device of the vehicle 200, a left rear SR motor 1RL is connected to the rear left wheel 202RL, and a right rear SR motor 1RR is connected to the rear right wheel 202RR. The rear wheels 202RR, 202RL are rotatable independently from each other. The rear left wheel 202RL is driven by the output torque (motor torque) of the left rear SR motor 1RL. The rear right wheel 202RR is driven by the output torque (motor torque) of the right rear SR motor 1RR. The SR motors 1RL and 1RR are connected to the battery 4 via the inverter 2 and the voltage drop unit 3. The SR motor 1 functions as an electric motor with the electrical power supplied from the battery 4, and functions as a generator that converts the torque (external force) transmitted from the rear wheels 202RR, 202RL into electrical power. An electrical circuit for the left rear SR motor 1RL and an electrical circuit for the right rear SR motor 1RR are included in the inverter 2.

The control device 100 controls the SR motors 1RL and 1RR and the engine 201. For example, a control unit for SR motors (an ECU for SR motors) and a control unit for an engine (an ECU for an engine) are included in the control device 100. In this case, the ECU for engine executes the engine torque control of controlling the output torque of the engine 201 to a targeted torque value depending on intake control, fuel injection control, ignition control, or the like. Additionally, the ECU for SR motors executes motor control regarding the SR motors 1RL and 1RR based on a signal input from the rotational speed sensor 51. A left rear rotational speed sensor 51RL that detects the rotational speed of the left rear SR motor 1RL, and a right rear rotational speed sensor 51RR that detects the rotational speed of the right rear SR motor 1RR are included in the rotational speed sensor 51.

As illustrated in FIG. 12, in a case where the SR motor 1 is mounted on a vehicle as a rear motor, the control device 100 determines the voltage at the time of voltage drop based on the available range of the voltage when the voltage at the time of voltage drop is determined in Step S5 illustrated in the above-described FIG. 3. The available range of the voltage is determined based on a drive state on a front side of the vehicle 200.

Specifically, a case where 300 V is not included within the available range of the voltage even in a case where the voltage at the time of voltage drop is set in advance to 300 V will be described. In this case, in Step S5, first, a preset voltage (300 V) at the time of voltage drop can be temporarily determined as the applied voltage, and whether or not the temporarily determined applied voltage is available is determined. Then, in a case where the temporarily determined applied voltage (300 V) is within the available range, the temporarily determined applied voltage (300 V) is determined as the voltage at the time of voltage drop as it is. On the other hand, in a case where the temporarily determined applied voltage (300 V) is not included within the available range, the applied voltage higher than the temporarily determined applied voltage (300 V) is determined as the voltage at the time of voltage drop. In this way, in Step S5, the applied voltage is determined as a voltage lower than 600 V at the normal time. However, the applied voltage can be set to a larger voltage than 300 V that is set in advance based on the available range of the voltage.

An example of a vehicle having the SR motor 1 as the driving power source is not limited to the example illustrated in FIG. 12. For example, the above may be a vehicle in which the front-side drive device and the rear-side drive device illustrated in FIG. 12 are replaced with each other, the SR motor 1 serving as a front motor drives the right and left front wheels 202FR, 202FL and the engine 201 drives the right and left rear wheels 202RR, 202RL. Additionally, a modification example of the rear-side drive device illustrated in FIG. 12 may be a vehicle in which one SR motor 1 is connected to the right and left rear wheels 202RR, 202RL via the differential gear and the right and left driving shafts. Moreover, another example of the applicable vehicle may include a vehicle (electrical vehicle) on which an engine is not mounted. The electrical vehicle may be a four-wheel drive vehicle in which all the front, rear, right, and left wheels 202 are provided with SR motors 1 serving as in-wheel motors. Another example of the electrical vehicle may be a front-wheel-drive electrical vehicle in which two SR motors 1 serving as front-side in-wheel motors drive the right and left front wheels 202FR, 202FL, or may be a rear-wheel-drive electrical vehicle in which the SR motor 1 serving as a rear motor drives the right and left rear wheels 202RR, 202RL. The rear-wheel-drive electrical vehicle may be a vehicle in which the right and left rear wheels 202RR, 202RL are driven by one SR motor 1, or may be a vehicle in which the SR motor 1 as an in-wheel motor is provided in each of the right and left rear wheels 202RR, 202RL.

What is claimed is:

1. A control device for a switched reluctance motor, the control device comprising an electronic control unit configured to execute a voltage drop control in which a voltage dropped to be lower than a voltage applied in a case where the switched reluctance motor is driven in a high-load region is applied to the switched reluctance motor, in a case where the switched reluctance motor is driven in a low-load region, the low-load region being a lower load region than the high-load region, wherein
   the electronic control unit is further configured to turn on a first switch and turn off a second switch to control a voltage of a battery to a power supply state for supplying power to the switched reluctance motor;
   the electronic control unit is further configured to turn off the first switch and turn on the second switch to control the voltage of the battery to a non-power supply state in which the switched reluctance motor is not supplied with power; and
   the voltage is dropped based on a ratio of time in the power supply state and time in the non-power supply state.

2. The control device according to claim 1, wherein the low-load region is a drive region in which at least one of a case where a rotational speed of the switched reluctance motor is lower than a predetermined rotational speed and a case where a torque of the switched reluctance motor is smaller than a predetermined torque is satisfied.

3. The control device according to claim 1, wherein the electronic control unit is further configured to gradually drop a voltage applied to the switched reluctance motor as an operation point of the switched reluctance motor changes from an operation point on a relatively high-load side to an operation point on a relatively low-load side within the low-load region when the voltage drop control is executed.

4. The control device according to claim 1,
   wherein the electronic control unit is further configured to execute the voltage drop control and control an excitation width of a current caused to flow to the switched reluctance motor to a predetermined width, in a case where the switched reluctance motor is driven in a region on a relatively high-load side within the low-load region, and
   wherein the electronic control unit is further configured to execute the voltage drop control and execute an excitation width expansion control in which the excitation width of the current caused to flow to the switched reluctance motor is expanded more than the predetermined width, in a case where the switched reluctance motor is driven in a region on a relatively low-load side within the low-load region.

5. The control device according to claim 4, wherein the electronic control unit is further configured to gradually expand the excitation width of the current as the operation point of the switched reluctance motor changes to the relatively low-load side within the low-load region when the excitation width expansion control is executed.

6. The control device according to claim 1, wherein the electronic control unit is further configured to execute control in a current waveform in which a value of a current flowing through the switched reluctance motor continues to decrease in a state where a positive voltage is applied to the switched reluctance motor when the voltage drop control is executed.

7. The control device according to claim 6, wherein the current waveform in which the value of the current continues to decrease is a current waveform in which the value of the current decreases more slowly than a current waveform in a state where a voltage applied to the switched reluctance motor is set to 0 V or a current waveform in a state where a negative voltage is applied to the switched reluctance motor.

* * * * *